United States Patent
Chandrashekar et al.

(10) Patent No.: US 11,566,705 B2
(45) Date of Patent: Jan. 31, 2023

(54) AXLE ASSEMBLY AND SHIFT MECHANISM FOR A SHIFT COLLAR

(71) Applicant: ArvinMeritor Technology, LLC, Troy, MI (US)

(72) Inventors: Supreeth Chandrashekar, Troy, MI (US); David Zueski, Troy, MI (US)

(73) Assignee: ArvinMeritor Technology, LLC, Troy, MI (US)

(*) Notice: Subject to any disclaimer, the term of this patent is extended or adjusted under 35 U.S.C. 154(b) by 108 days.

(21) Appl. No.: 17/220,729

(22) Filed: Apr. 1, 2021

(65) Prior Publication Data
US 2022/0316590 A1 Oct. 6, 2022

(51) Int. Cl.
F16H 61/32 (2006.01)
F16H 61/684 (2006.01)
F16H 61/00 (2006.01)

(52) U.S. Cl.
CPC ......... *F16H 61/32* (2013.01); *F16H 61/0003* (2013.01); *F16H 61/684* (2013.01)

(58) Field of Classification Search
CPC ..... F16H 61/684; F16H 61/0003; F16H 61/32
See application file for complete search history.

(56) References Cited

U.S. PATENT DOCUMENTS

| | | | |
|---|---|---|---|
| 1,981,236 A | 11/1934 | Logue | |
| 4,428,248 A * | 1/1984 | Brouckxou | F16H 61/32 192/48.91 |
| 6,176,146 B1 | 1/2001 | Ore | |
| 7,798,937 B2 | 9/2010 | Gitt | |
| 9,194,485 B2 | 11/2015 | McCloy | |
| 9,719,563 B2 | 8/2017 | Hirao | |
| 10,293,688 B2 * | 5/2019 | Arai | F16H 37/065 |
| 10,309,522 B2 * | 6/2019 | Palazzolo | B60K 17/35 |
| 10,697,533 B2 * | 6/2020 | Yamamoto | F16H 57/0489 |
| 11,300,202 B2 * | 4/2022 | Reisch | F16H 63/304 |
| 2011/0111910 A1 | 5/2011 | Ideshio et al. | |
| 2014/0311266 A1 | 10/2014 | Nakashima et al. | |
| 2017/0036538 A1 * | 2/2017 | Imafuku | F16D 28/00 |
| 2017/0059007 A1 | 3/2017 | Eo et al. | |
| 2018/0015816 A1 | 1/2018 | Robinette et al. | |
| 2018/0112770 A1 | 4/2018 | Hansson et al. | |
| 2019/0054816 A1 | 2/2019 | Garcia et al. | |
| 2019/0054817 A1 | 2/2019 | Garcia et al. | |
| 2019/0054818 A1 | 2/2019 | Garcia et al. | |
| 2020/0173494 A1 | 6/2020 | Smith et al. | |
| 2020/0173531 A1 | 6/2020 | Smith | |

(Continued)

FOREIGN PATENT DOCUMENTS

WO 2018/134009 A1 7/2018

OTHER PUBLICATIONS

Ghatti et al., U.S. Appl. No. 16/594,362, filed Oct. 7, 2019; (Related Appln. No. MERIT190031PUS); 31 Pages.

(Continued)

*Primary Examiner* — David M Fenstermacher
(74) *Attorney, Agent, or Firm* — Brooks Kushman PC (57) ABSTRACT

A shift mechanism having a biasing member that operatively connects a detent linkage to a linkage. The biasing member permits an actuator shaft of an actuator and the detent linkage to rotate about an actuator axis with respect to the linkage when a shift collar is inhibited from moving along the axis.

20 Claims, 9 Drawing Sheets

(56) References Cited

U.S. PATENT DOCUMENTS

| | | |
|---|---|---|
| 2020/0173535 A1 | 6/2020 | Peng et al. |
| 2020/0173537 A1 | 6/2020 | Begov et al. |
| 2020/0173541 A1 | 6/2020 | Soffner et al. |
| 2020/0177049 A1 | 6/2020 | Raya et al. |
| 2020/0177059 A1 | 6/2020 | Smith et al. |
| 2022/0290755 A1* | 9/2022 | Trinh .................... F16H 63/04 |

OTHER PUBLICATIONS

Ghatti et al., U.S. Appl. No. 16/594,702, filed Oct. 7, 2019; (Related Appln. No. MERIT190032PUS); 32 Pages.
Ghatti et al., U.S. Appl. No. 16/594,932, filed Oct. 7, 2019; (Related Appln. No. MERIT190033PUS); 33 Pages.
Ghatti et al., U.S. Appl. No. 16/594,875, filed Oct. 7, 2019; (Related Appln. No. MERIT190034PUS); 49 Pages.
Hadad et al., U.S. Appl. No. 17/063,866, filed Oct. 6, 2020; (Related Appln. No. MERIT200047PUS); 63 Pages.
Extended European Search Report and Written Opinion for Application No. 22165123.5, dated Aug. 31, 2022, 12 pages.
India First Examination Report dated Oct. 10, 2022 for India Application No. 202214016977; 7 pages.

* cited by examiner

AXLE ASSEMBLY AND SHIFT MECHANISM FOR A SHIFT COLLAR

TECHNICAL FIELD

This disclosure relates to a shift mechanism for a shift collar and an axle assembly having a shift mechanism.

BACKGROUND

An axle assembly having a clutch collar is disclosed in U.S. Pat. No. 9,719,563.

SUMMARY

In at least one embodiment a shift mechanism is provided. The shift mechanism may include a shift collar, an actuator, a detent linkage, a linkage, a shift collar, and a biasing member. The actuator may have an actuator shaft that is rotatable about an actuator axis. The detent linkage may be rotatable about the actuator axis with the actuator shaft. The linkage may be rotatable about the actuator axis. The shift collar may be operatively connected to the linkage and may be moveable along an axis. The biasing member may operatively connect the detent linkage to the linkage and may permit the actuator shaft and the detent linkage to rotate about the actuator axis with respect to the linkage when the shift collar is inhibited from moving along the axis.

In at least one embodiment a shift mechanism is provided. The shift mechanism may include an actuator, a detent linkage, a linkage, a shift collar, and a biasing member. The actuator may have an actuator shaft that is rotatable about an actuator axis. The detent linkage may have a detent linkage shaft and a detent linkage plate. The detent linkage shaft may be disposed along the actuator axis. The detent linkage plate may extend from the detent linkage shaft. The linkage may be rotatable about the actuator axis. The shift collar may be operatively connected to the linkage and may be moveable along an axis. The biasing member may control relative rotational movement of the linkage and the detent linkage. The biasing member may include a first coil and a second coil. The first coil may extend around the actuator axis and may have a first tab that may extend away from the actuator axis. The second coil may extend around the actuator axis and may be disposed adjacent to the first coil. The second coil may have a second tab that extends away from the actuator axis. The first tab and the second tab may be positioned about the actuator axis such that the first tab is rotationally offset from the second tab.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
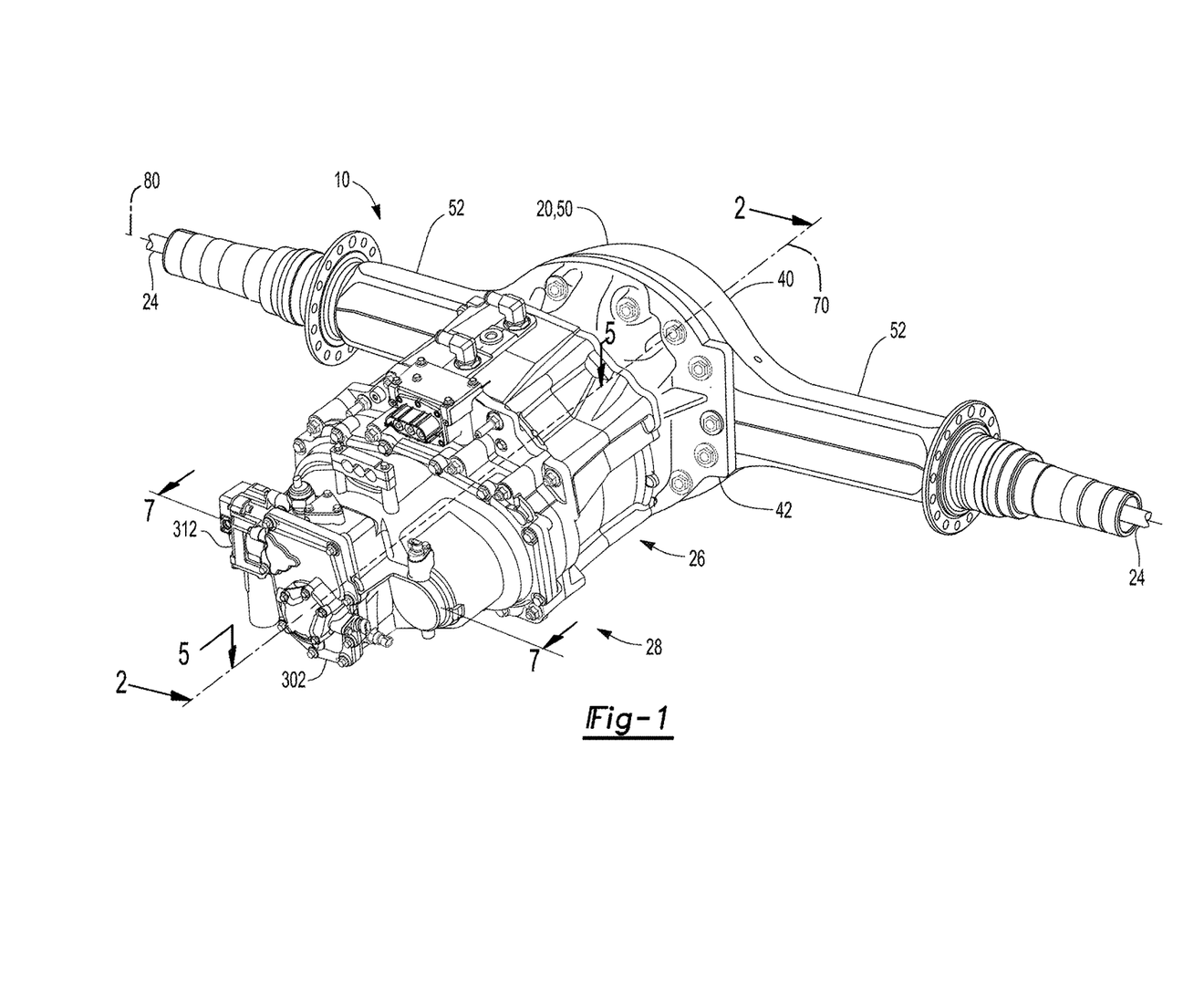
FIG. 1 is a perspective view of an example of an axle assembly.

Referring to FIG. 1, an example of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 may provide torque to one or more traction wheel assemblies that may include a tire mounted on a wheel. The wheel may be mounted to a wheel hub that may be rotatable about a wheel axis.

One or more axle assemblies may be provided with the vehicle. As is best shown with reference to FIGS. 1 and 2, the axle assembly 10 may include a housing assembly 20, a differential assembly 22, at least one axle shaft 24, an electric motor module 26, and a transmission module 28, a drive pinion 30, a shift mechanism 32, or combinations thereof.

Housing Assembly

Referring to FIG. 1, the housing assembly 20 may receive various components of the axle assembly 10. In addition, the housing assembly 20 may facilitate mounting of the axle assembly 10 to the vehicle. In at least one configuration, the housing assembly 20 may include an axle housing 40 and a differential carrier 42.

The axle housing 40 may receive and may support the axle shafts 24. In at least one configuration, the axle housing 40 may include a center portion 50 and at least one arm portion 52.

Figure 2:
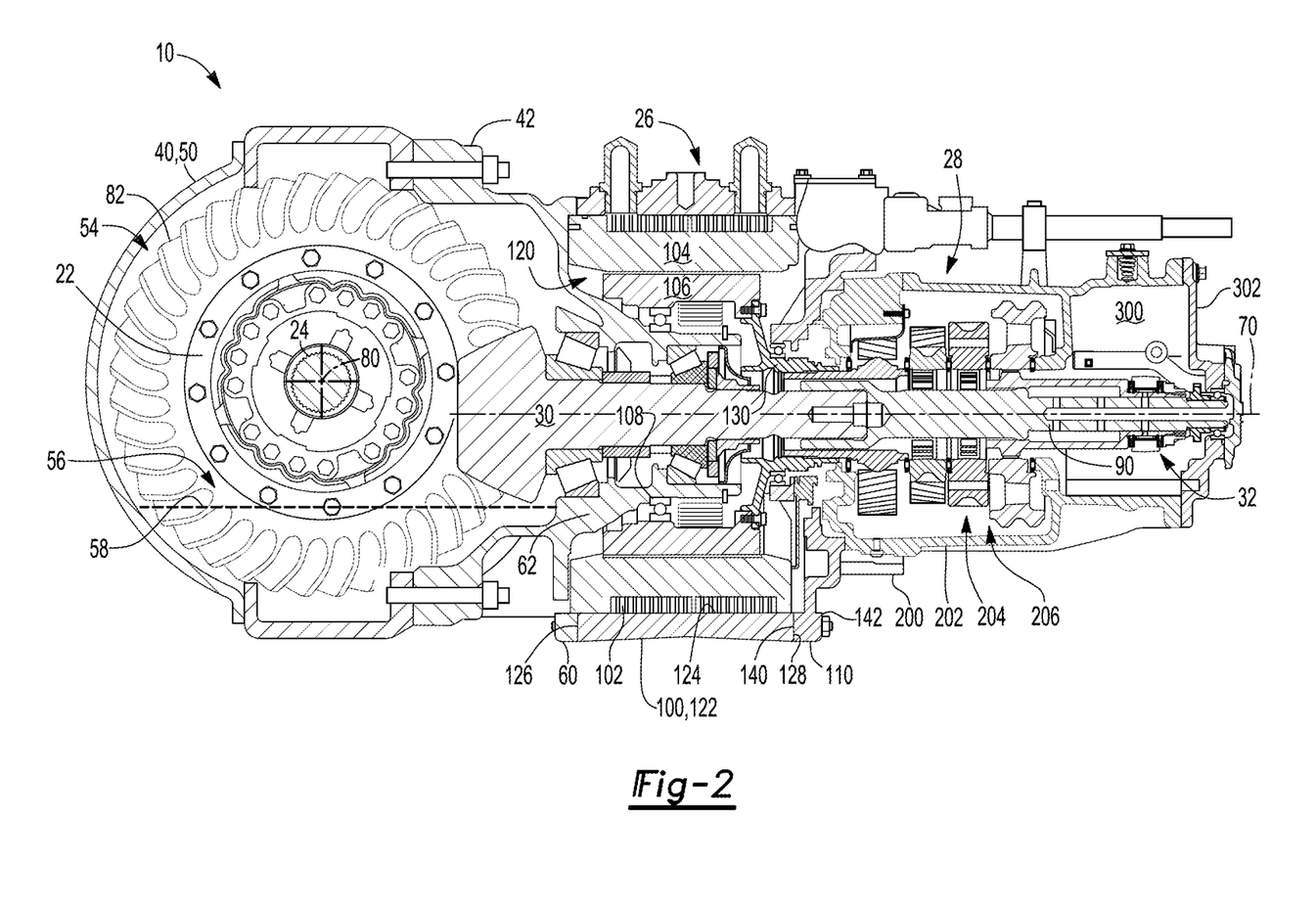
FIG. 2 is a section view of the axle assembly along section line 2-2.

The center portion 50 may be disposed proximate the center of the axle housing 40. As is best shown in FIG. 2, the center portion 50 may define a cavity 54 that may at least partially receive the differential assembly 22. A lower region of the center portion 50 may at least partially define a sump portion 56 that may contain or collect lubricant 58. Lubricant 58 in the sump portion 56 may be splashed by a ring gear 82 of the differential assembly 22 and distributed to lubricate various components that may or may not be received in the housing assembly 20. For instance, some splashed lubricant 58 may lubricate components that are received in the cavity 54 like the differential assembly 22, bearing assemblies that rotatably support the differential assembly 22, a drive pinion 30, and so on, while some splashed lubricant 58 may be routed out of the cavity 54 to lubricate components located outside of the housing assembly 20, such as components associated with the transmission module 28, the shift mechanism 32, or both.

Referring to FIG. 1, one or more arm portions 52 may extend from the center portion 50. For instance, two arm portions 52 may extend in opposite directions from the center portion 50 and away from the differential assembly 22. The arm portions 52 may have similar configurations. For example, the arm portions 52 may each have a hollow tubular configuration that may extend around and may receive a corresponding axle shaft 24 and may help separate or isolate the axle shaft 24 or a portion thereof from the surrounding environment. An arm portion 52 or a portion thereof may or may not be integrally formed with the center portion 50. It is also contemplated that the arm portions 52 may be omitted.

Referring primarily to FIG. 2, the differential carrier 42 may be mounted to the center portion 50 of the axle housing 40. The differential carrier 42 may support the differential assembly 22 and may facilitate mounting of the electric motor module 26. For example, the differential carrier 42 may include one or more bearing supports that may support a bearing like a roller bearing assembly that may rotatably support the differential assembly 22. In at least one configuration, the differential carrier 42 may include a mounting flange 60 and/or a bearing support wall 62.

The mounting flange 60 may facilitate mounting of the electric motor module 26. As an example, the mounting flange 60 may be configured as a ring that may extend around the axis 70. In at least one configuration, the mounting flange 60 may include a set of fastener holes that may be configured to receive fasteners that may secure the electric motor module 26 to the mounting flange 60.

The bearing support wall 62 may support bearings that may rotatably support other components of the axle assembly 10. For example, the bearing support wall 62 may support a bearing that may rotatably support the drive pinion 30, a bearing that may rotatably support a rotor of the electric motor module 26, or both. The bearing support wall 62 may extend in an axial direction away from the axle housing 40 and may extend around the axis 70. The bearing support wall 62 may define a hole that may extend along or around the axis 70 and receive the drive pinion 30 and the bearings that rotatably support the drive pinion 30. The bearing support wall 62 may be integrally formed with the differential carrier 42 or may be a separate component that is fastened to the differential carrier 42.

Differential Assembly, Drive Pinion, and Axle Shafts

Referring to FIG. 2, the differential assembly 22 may be at least partially received in the center portion 50 of the housing assembly 20. The differential assembly 22 may be rotatable about a differential axis 80 and may transmit torque to the axle shafts 24 and wheels. The differential assembly 22 may be operatively connected to the axle shafts 24 and may permit the axle shafts 24 to rotate at different rotational speeds in a manner known by those skilled in the art. The differential assembly 22 may have a ring gear 82 that may have teeth that mate or mesh with the teeth of a gear portion of a drive pinion 30. Accordingly, the differential assembly 22 may receive torque from the drive pinion 30 via the ring gear 82 and transmit torque to the axle shafts 24.

The drive pinion 30 may operatively connect the transmission module 28 to the differential assembly 22. As such, the drive pinion 30 may transmit torque between the differential assembly 22 and the transmission module 28. In at least one configuration, the drive pinion 30 may be rotatable about the axis 70 and may be rotatably supported inside another component, such as the bearing support wall 62.

Referring primarily to FIG. 2, the drive pinion 30 may optionally include or may be coupled to a drive pinion extension 90. The drive pinion extension 90 may increase the axial length of the drive pinion 30. In at least one configuration, the drive pinion extension 90 may be a separate component from the drive pinion 30 and may be coupled to the drive pinion 30 such that the drive pinion extension 90 is rotatable about the axis 70 with the drive pinion 30. In addition, the drive pinion extension 90 may be fixedly positioned with respect to the drive pinion 30 such that the drive pinion extension 90 may not move along the axis 70 with respect to the drive pinion 30. It is also contemplated that the drive pinion extension 90 may be integrally formed with the drive pinion 30, in which case the drive pinion 30 may be a one-piece unitary component having a greater axial length.

In at least one configuration, the drive pinion extension 90 may extend from a first end 92 to a second end 94 and may include a socket 96 and the spline 98. The socket 96 may extend from the first end 92 and may receive the drive pinion 30. The second end 94 may be received inside and may be rotatably supported by a support bearing. The spline 98, if provided, may facilitate coupling of the drive pinion extension 90 to a shift collar 310 that may be moveable along the axis 70 as will be discussed in more detail below.

Referring to FIG. 1, the axle shafts 24 may transmit torque from the differential assembly 22 to corresponding wheel hubs and wheels. Two axle shafts 24 may be provided such that each axle shaft 24 extends through a different arm portion 52 of axle housing 40. The axle shafts 24 may extend along and may be rotatable about an axis, such as the differential axis 80. Each axle shaft 24 may have a first end and a second end. The first end may be operatively connected to the differential assembly 22. The second end may be disposed opposite the first end and may be operatively connected to a wheel. Optionally, gear reduction may be provided between an axle shaft 24 and a wheel.

Electric Motor Module

Referring to FIG. 2, the electric motor module 26, which may also be referred to as an electric motor, may be mounted to the differential carrier 42 and may be operatively connectable to the differential assembly 22. For instance, the electric motor module 26 may provide torque to the differential assembly 22 via the transmission module 28 and the drive pinion 30 as will be discussed in more detail below. The electric motor module 26 may be primarily disposed outside the differential carrier 42. In addition, the electric motor module 26 may be axially positioned between the axle housing 40 and the transmission module 28. In at least one configuration, the electric motor module 26 may include a motor housing 100, a coolant jacket 102, a stator 104, a rotor 106, and at least one rotor bearing assembly 108. The electric motor module 26 may also include a motor cover 110.

The motor housing 100 may extend between the differential carrier 42 and the motor cover 110. The motor housing 100 may be mounted to the differential carrier 42 and the motor cover 110. For example, the motor housing 100 may extend from the mounting flange 60 of the differential carrier 42 to the motor cover 110. The motor housing 100 may extend around the axis 70 and may define a motor housing cavity 120. The motor housing cavity 120 may be disposed inside the motor housing 100 and may have a generally cylindrical configuration. The bearing support wall 62 of the differential carrier 42 may be located inside the motor housing cavity 120. Moreover, the motor housing 100 may extend continuously around and may be spaced apart from the bearing support wall 62. In at least one configuration, the motor housing 100 may have an exterior side 122, an interior side 124, a first end surface 126, and a second end surface 128.

The exterior side 122 may face away from the axis 70 and may define an exterior or outside surface of the motor housing 100.

The interior side 124 may be disposed opposite the exterior side 122 and may face toward the axis 70. The interior side 124 may be disposed at a substantially constant radial distance from the axis 70 in one or more configurations.

The first end surface 126 may extend between the exterior side 122 and the interior side 124. The first end surface 126 may be disposed at an end of the motor housing 100 that may face toward the differential carrier 42. For instance, the first end surface 126 may be disposed adjacent to the mounting flange 60 of the differential carrier 42 and may engage or contact the mounting flange 60.

The second end surface 128 may be disposed opposite the first end surface 126. As such, the second end surface 128 may be disposed at an end of the motor housing 100 that may face toward the motor cover 110 and may engage or contact the motor cover 110.

The coolant jacket 102 may help cool or remove heat from the stator 104. The coolant jacket 102 may be received in the motor housing cavity 120 of the motor housing 100 and may engage the interior side 124 of the motor housing 100. The coolant jacket 102 may extend axially (e.g., in a direction along the axis 70) between the differential carrier 42 and the motor cover 110. For example, the coolant jacket 102 may extend axially from the differential carrier 42 to the motor cover 110. In addition, the coolant jacket 102 may extend around the axis 70 and around the stator 104. Accordingly, the stator 104 may be at least partially received in and may be encircled by the coolant jacket 102. The coolant jacket 102 may extend in a radial direction from the stator 104 to the interior side 124 of the motor housing 100. In at least one configuration, the coolant jacket 102 may include a plurality of channels through which coolant may flow.

The stator 104 may be received in the motor housing cavity 120. The stator 104 may be fixedly positioned with respect to the coolant jacket 102. For example, the stator 104 may extend around the axis 70 and may include stator windings that may be received inside and may be fixedly positioned with respect to the coolant jacket 102.

The rotor 106 may extend around and may be rotatable about the axis 70. In addition, the rotor 106 may extend around and may be supported by the bearing support wall 62. The rotor 106 may be received inside the stator 104, the coolant jacket 102, and the motor housing cavity 120 of the motor housing 100. The rotor 106 may be rotatable about the axis 70 with respect to the differential carrier 42 and the stator 104. In addition, the rotor 106 may be spaced apart from the stator 104 but may be disposed in close proximity to the stator 104.

One or more rotor bearing assemblies 108 may rotatably support the rotor 106. For example, a rotor bearing assembly 108 may extend around and receive the bearing support wall 62 of the differential carrier 42 and may be received inside of the rotor 106. The rotor 106 may be operatively connected to the drive pinion 30. For instance, a coupling such as a rotor output flange 130 may operatively connect the rotor 106 to the transmission module 28, which in turn may be operatively connectable to the drive pinion 30.

The motor cover 110 may be mounted to the motor housing 100 and may be disposed opposite the axle housing 40 and the differential carrier 42. For example, the motor cover 110 may be mounted to the second end surface 128 of the motor housing 100. The motor cover 110 may be spaced apart from and may not engage the differential carrier 42.

The motor cover 110 may be provided in various configurations. In at least one configuration, the motor cover 110 may include a first side 140 and a second side 142. The first side 140 may face toward and may engage the motor housing 100. The second side 142 may be disposed opposite the first side 140. The second side 142 may face away from the motor housing 100. The motor cover 110 may also include a motor cover opening through which the drive pinion 30 may extend. The motor cover 110 may be integrated with the transmission module 28 or may be a separate component.

Transmission Module

Figure 5:
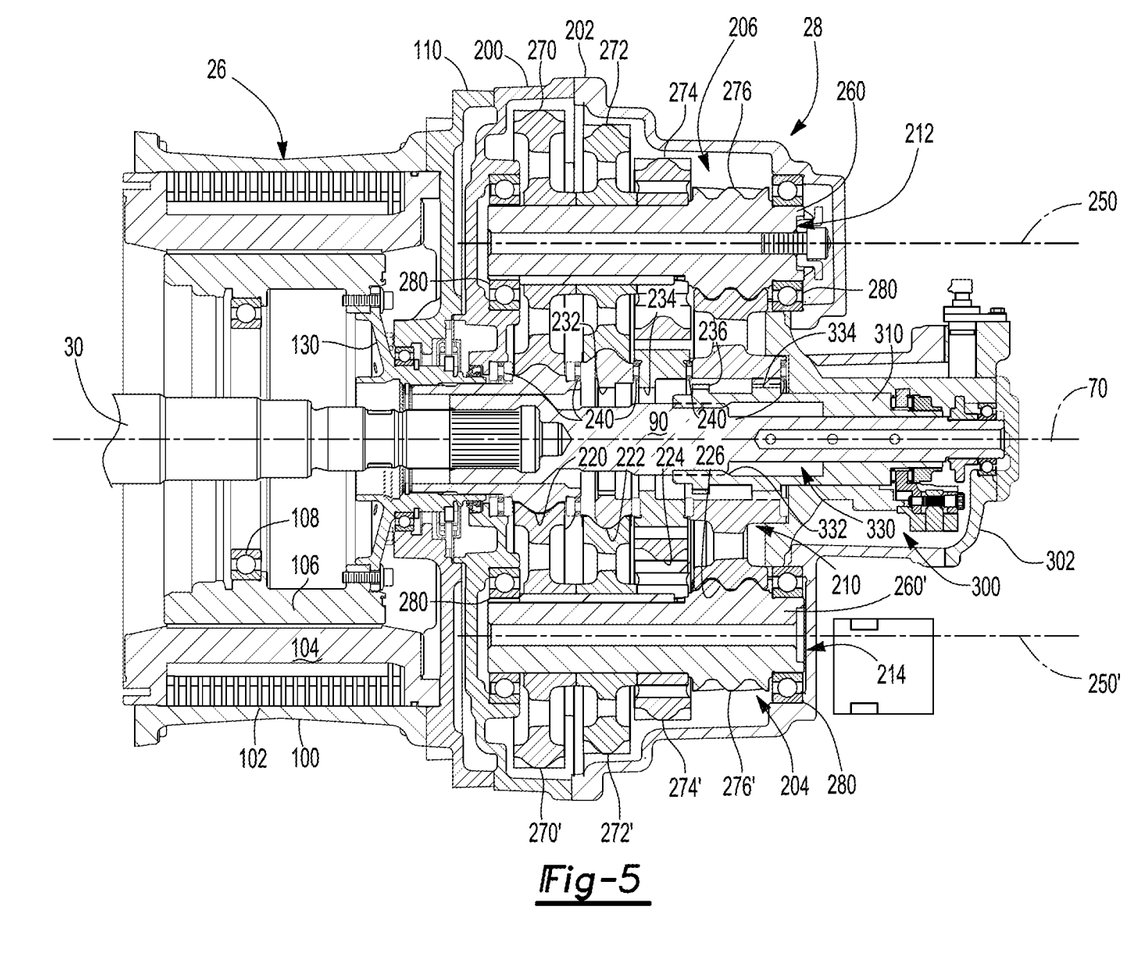
FIG. 5 is a section view of a portion of the axle assembly along section line 5-5.

Referring to FIGS. 2 and 5, the transmission module 28 may transmit torque between the electric motor module 26 and the differential assembly 22. As such, the transmission module 28 may be operatively connectable to the electric motor module 26 and the differential assembly 22. In at least one configuration, the transmission module 28 may include a first transmission housing 200, a second transmission housing 202, and a transmission 204. The first transmission housing 200 and the second transmission housing 202 may cooperate to define a transmission housing cavity 206 that may receive the transmission 204.

The first transmission housing 200 may be mounted to the electric motor module 26. For instance, the first transmission housing 200 may be mounted to the second side 142 of the motor cover 110. As such, the motor cover 110 may separate the first transmission housing 200 from the motor housing 100.

The second transmission housing 202 may be mounted to the first transmission housing 200. For instance, the first transmission housing 200 may be mounted to and may engage or contact a side of the first transmission housing 200 that may face away from the motor cover 110. As such, the first transmission housing 200 may separate the second transmission housing 202 from the motor cover 110.

The transmission 204 may be operatively connected to the electric motor. In at least one configuration and as is best shown in FIG. 5, the transmission 204 may be configured as a countershaft transmission that may include a set of drive pinion gears 210, a first countershaft gear set 212, and optionally a second countershaft gear set 214.

The set of drive pinion gears 210 may be received in the transmission housing cavity 206 and may be arranged along the axis 70 between the first transmission housing 200 and the second transmission housing 202. The set of drive pinion gears 210 may include a plurality of gears, some of which may be selectively coupled to the drive pinion 30. In the configuration shown, the set of drive pinion gears 210 includes a first gear 220, a second gear 222, a third gear 224, and a fourth gear 226; however, it is to be understood that a greater or lesser number of gears may be provided.

The first gear 220 may extend around the axis 70 and may be disposed proximate the first transmission housing 200. In at least one configuration, the first gear 220 may have a through hole that may receive the drive pinion 30, an extension of the drive pinion 30 like the drive pinion extension 90, or both. The first gear 220 may have a plurality of teeth that may be arranged around and may extend away from the axis 70. The teeth of the first gear 220 may contact and may mate or mesh with teeth of a first countershaft gear that may be provided with the first countershaft gear set 212 and the second countershaft gear set 214 as will be discussed in more detail below. The first gear 220 may be operatively connected to the rotor 106 of the electric motor module 26 such that the rotor 106 and the first gear 220 are rotatable together about the axis 70. For example, the first gear 220 may be fixedly positioned with respect to the rotor 106 or fixedly coupled to the rotor 106 such that the first gear 220 is not rotatable about the axis 70 with respect to the rotor 106. It is contemplated that the first gear 220 may be fixedly mounted to or integrally formed with the rotor output flange 130. As such, the first gear 220 may be continuously connected to the rotor 106 such that the first gear 220 and the rotor 106 may be rotatable together about the axis 70 but may not be rotatable with respect to each other. It is also contemplated that the first gear 220 may be selectively coupled to the drive pinion 30 or drive pinion extension 90, such as with a shift collar. In addition, the first gear 220 may be decoupled from the drive pinion 30 and may be rotatable with respect to the drive pinion 30. As such, a clutch or shift collar 310 may not connect the first gear 220 to the drive pinion 30 or the drive pinion extension 90. The drive pinion extension 90, if provided, may be received inside the first gear 220 and may be spaced apart from the first gear 220. In at least one configuration, the first gear 220 may be axially positioned along the axis 70 between the second gear 222 and the electric motor module 26.

Figure 7:
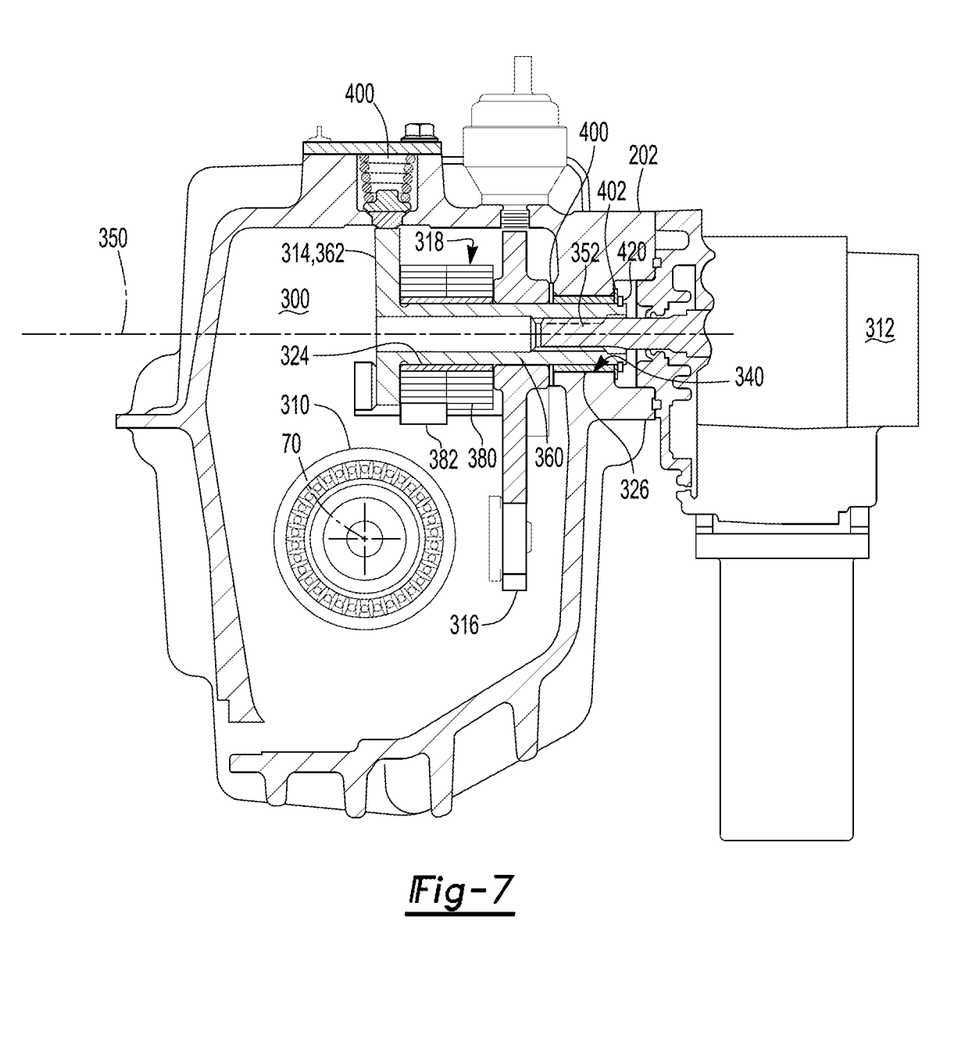
FIG. 7 is a section view of a portion of the axle assembly along section line 7-7.

Referring to FIG. 5, the second gear 222 may extend around the axis 70. In at least one configuration, the second gear 222 may have a through hole that may receive the drive pinion 30, the drive pinion extension 90, or both. The second gear 222 may have a plurality of teeth that may be arranged around and may extend away from the axis 70. The teeth of the second gear 222 may contact and may mate or mesh with teeth of a second countershaft gear that may be provided with the first countershaft gear set 212 and the second countershaft gear set 214 as will be discussed in more detail below. As is best shown in FIG. 7, the second gear 222 may also have inner gear teeth 232 that may extend toward the axis 70 and may be received in the through hole. The second gear 222 may have a different diameter than the first gear 220. For example, the second gear 222 may have a larger diameter than the first gear 220 as is best shown in FIG. 5. In at least one configuration, the second gear 222 may be axially positioned along the axis 70 between the first gear 220 and the third gear 224. The drive pinion 30 or drive pinion extension 90, if provided, may be received inside the second gear 222 and may be spaced apart from the second gear 222 in one or more configurations.

The third gear 224 may extend around the axis 70. In at least one configuration, the third gear 224 may have a through hole that may receive the drive pinion 30, the drive pinion extension 90, or both. The third gear 224 may have a plurality of teeth that may be arranged around and may extend away from the axis 70. The teeth of the third gear 224 may contact and may mate or mesh with teeth of a third countershaft gear that may be provided with the first countershaft gear set 212 and the second countershaft gear set 214 as will be discussed in more detail below. As is best shown in FIG. 7, the third gear 224 may also have inner gear teeth 234 that may extend toward the axis 70 and may be received in the through hole. The third gear 224 may have a different diameter than the first gear 220 and the second gear 222. For example, the third gear 224 may have a larger diameter than the first gear 220 and the second gear 222 as is best shown in FIG. 5. In at least one configuration, the third gear 224 be axially positioned along the axis 70 between the second gear 222 and the fourth gear 226. The drive pinion 30 or drive pinion extension 90, if provided, may be received inside the third gear 224 and may be spaced apart from the third gear 224 in one or more configurations.

The fourth gear 226 may extend around the axis 70. In at least one configuration, the fourth gear 226 may have a through hole that may receive the drive pinion 30, the drive pinion extension 90, or both. The fourth gear 226 may have a plurality of teeth that may be arranged around and may extend away from the axis 70. The teeth of the fourth gear 226 may contact and may mate or mesh with teeth of a fourth countershaft gear that may be provided with the first countershaft gear set 212 and the second countershaft gear set 214 as will be discussed in more detail below. As is best shown in FIG. 7, the fourth gear 226 may also have inner gear teeth 236 that may extend toward the axis 70 and may be received in the through hole. The fourth gear 226 may have a different diameter than the first gear 220, the second gear 222, and the third gear 224, such as a larger diameter. In at least one configuration, the fourth gear 226 be axially positioned along the axis 70 further from the electric motor module 26 than the first gear 220, the second gear 222, and the third gear 224. As such, the fourth gear 226 may be axially positioned proximate or adjacent to a side of the second transmission housing 202 that is disposed opposite the first transmission housing 200. The drive pinion 30 or drive pinion extension 90 may be received inside the fourth gear 226 and may be spaced apart from the fourth gear 226 in one or more configurations.

Thrust bearings 240 may optionally be provided between members of the set of drive pinion gears 210, between the first transmission housing 200 and the set of drive pinion gears 210, between the second transmission housing 202 and the set of drive pinion gears 210, or combinations thereof. For instance, a first thrust bearing 240 may be axially positioned between the first transmission housing 200 and the first gear 220, a second thrust bearing 240 may be axially positioned between the first gear 220 and the second gear 222, a third thrust bearing 240 may be axially positioned between the second gear 222 and the third gear 224, a fourth thrust bearing 240 may be axially positioned between the third gear 224 and the fourth gear 226, and a fifth thrust bearing 240 may be axially positioned between the fourth gear 226 and the second transmission housing 202.

The first countershaft gear set 212 may be received in the transmission housing cavity 206 and may be in meshing engagement with the set of drive pinion gears 210. The first countershaft gear set 212 may be rotatable about a first countershaft axis 250. The first countershaft axis 250 may be disposed parallel or substantially parallel to the axis 70 in one or more embodiments. The first countershaft gear set 212 may include a first countershaft 260 and a plurality of gears. In the configuration shown, the plurality of gears of the first countershaft gear set 212 include a first countershaft gear 270, a second countershaft gear 272, a third countershaft gear 274, and a fourth countershaft gear 276; however, it is contemplated that a greater number of countershaft gears or a lesser number of countershaft gears may be provided.

The first countershaft 260 may be rotatable about the first countershaft axis 250. For instance, the first countershaft 260 may be rotatably supported on the first transmission housing 200 and the second transmission housing 202 by corresponding bearing assemblies 280. For example, first and second bearing assemblies 280 may be located near opposing first and second ends the first countershaft 260, respectively. The first countershaft 260 may support and be rotatable with the first countershaft gear 270, the second countershaft gear 272, the third countershaft gear 274, and the fourth countershaft gear 276.

The first countershaft gear 270 may be fixedly disposed on the first countershaft 260 or fixedly mounted to the first countershaft 260. As such, the first countershaft gear 270 may rotate about the first countershaft axis 250 with the first countershaft 260 and may not be rotatable with respect to the first countershaft 260. For example, the first countershaft gear 270 may have a hole that may receive the first countershaft 260 and may be fixedly coupled to the first countershaft 260. The first countershaft gear 270 may extend around the first countershaft axis 250 and may have a plurality of teeth that may be arranged around and may extend away from the first countershaft axis 250. The teeth of the first countershaft gear 270 may contact and may mate or mesh with the teeth of the first gear 220. In at least one configuration, the first countershaft gear 270 may be axially positioned along the first countershaft axis 250 between the first transmission housing 200 and the second countershaft gear 272 of the first countershaft gear set 212.

The second countershaft gear 272 may be fixedly disposed on the first countershaft 260 or fixedly mounted to the first countershaft 260. As such, the second countershaft gear 272 may rotate about the first countershaft axis 250 with the first countershaft 260 and may not be rotatable with respect to the first countershaft 260. For example, the second countershaft gear 272 may have a hole that may receive the first countershaft 260 and may be fixedly coupled to the first countershaft 260. The second countershaft gear 272 may extend around the first countershaft axis 250 and may have a plurality of teeth that may be arranged around and may extend away from the first countershaft axis 250. The teeth of the second countershaft gear 272 may contact and may mate or mesh with the teeth of the second gear 222. The second countershaft gear 272 may have a different diameter than the first countershaft gear 270 and the third countershaft gear 274. In at least one configuration, the second countershaft gear 272 may be axially positioned along the first countershaft axis 250 between the first countershaft gear 270 of the first countershaft gear set 212 and the third countershaft gear 274 of the first countershaft gear set 212.

The third countershaft gear 274 may be fixedly disposed on the first countershaft 260 or fixedly mounted to the first countershaft 260. As such, the third countershaft gear 274 may rotate about the first countershaft axis 250 with the first countershaft 260 and may not be rotatable with respect to the first countershaft 260. For example, the third countershaft gear 274 may have a hole that may receive the first countershaft 260 and may be fixedly coupled to the first countershaft 260. The third countershaft gear 274 may extend around the first countershaft axis 250 and may have a plurality of teeth that may be arranged around and may extend away from the first countershaft axis 250. The teeth of the third countershaft gear 274 may contact and may mate or mesh with the teeth of the third gear 224. The third countershaft gear 274 may have a different diameter than the first countershaft gear 270 and the second countershaft gear 272. In at least one configuration, the third countershaft gear 274 may be axially positioned along the first countershaft axis 250 between the second countershaft gear 272 of the first countershaft gear set 212 and the fourth countershaft gear 276 of the first countershaft gear set 212.

The fourth countershaft gear 276 may be fixedly disposed on the first countershaft 260 or fixedly mounted to the first countershaft 260. As such, the fourth countershaft gear 276 may rotate about the first countershaft axis 250 with the first countershaft 260 and may not be rotatable with respect to the first countershaft 260. For example, the fourth countershaft gear 276 may have a hole that may receive the first countershaft 260 and may be fixedly coupled to the first countershaft 260 or may be integrally formed with the first countershaft 260. The fourth countershaft gear 276 may extend around the first countershaft axis 250 and may have a plurality of teeth that may be arranged around and may extend away from the first countershaft axis 250. The teeth of the fourth countershaft gear 276 may contact and may mate or mesh with the teeth of the fourth gear 226. The fourth countershaft gear 276 may have a different diameter than the first countershaft gear 270, the second countershaft gear 272, and the third countershaft gear 274. In at least one configuration, the fourth countershaft gear 276 may be axially positioned along the first countershaft axis 250 further from the electric motor module 26 than the third countershaft gear 274 of the first countershaft gear set 212.

The second countershaft gear set 214, if provided, may be received in the transmission housing cavity 206 and may be rotatable about a second countershaft axis 250'. The second countershaft axis 250' may be disposed parallel or substantially parallel to the axis 70 and the first countershaft axis 250 in one or more embodiments. The second countershaft gear set 214 may generally be disposed on an opposite side of the axis 70 from the first countershaft gear set 212 or may be disposed such that the first countershaft axis 250 and the second countershaft axis 250' may be disposed at a common radial distance from the axis 70. The first and second countershaft gear sets 212, 214 may be positioned at any suitable rotational angle or position about the axis 70.

The second countershaft gear set 214 may have the same or substantially the same configuration as the first countershaft gear set 212. For example, the second countershaft gear set 214 may include a second countershaft 260' that may be analogous to or may have the same structure as the first countershaft 260. In addition, the second countershaft gear set 214 may include a plurality of gears that are rotatable with the second countershaft 260'. In the configuration shown, the plurality of gears of the second countershaft gear set 214 include a first countershaft gear 270', a second countershaft gear 272', a third countershaft gear 274', and a fourth countershaft gear 276'; however, it is contemplated that a greater number of gears or a lesser number of gears may be provided. The first countershaft gear 270', second countershaft gear 272', third countershaft gear 274', and the fourth countershaft gear 276' of the second countershaft gear set 214 may be analogous to or may have the same structure as the first countershaft gear 270, second countershaft gear 272, third countershaft gear 274, and the fourth countershaft gear 276, respectively, of the first countershaft gear set 212. The first countershaft gear 270', second countershaft gear 272', third countershaft gear 274', and the fourth countershaft gear 276' may be arranged along and may be rotatable about a second countershaft axis 250' rather than the first countershaft axis 250 and may be fixed to the second countershaft 260' rather than the first countershaft 260.

The first gear 220 and the first countershaft gears 270, 270' may provide a different gear ratio than the second gear 222 and the second countershaft gears 272, 272', the third gear 224 and the third countershaft gears 274, 274', and the fourth gear 226 and the fourth countershaft gears 276, 276'. Gear ratios may be provided that are greater than 1:1, less than 1:1, equal (i.e., 1:1), or combinations thereof.

The teeth of the drive pinion gears and the countershaft gears may be of any suitable type. As a non-limiting example, the meshing teeth of the members of the set of drive pinion gears 210, the gears of the first countershaft gear set 212, and the gears of the second countershaft gear set 214 may have a helical configuration.

Shift Mechanism

Figure 3:
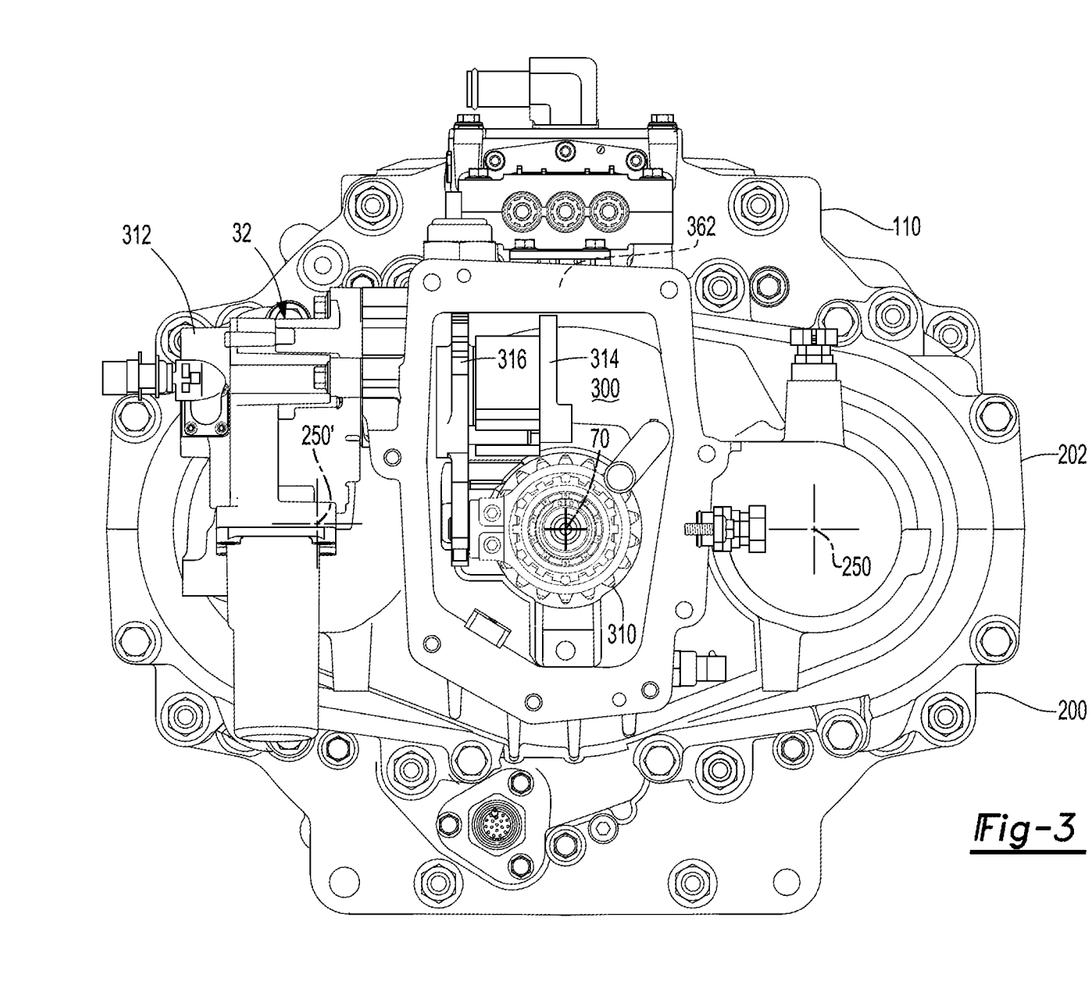
FIG. 3 is an end view of the axle assembly with a cover at the end of the axle assembly removed.
Figure 4:
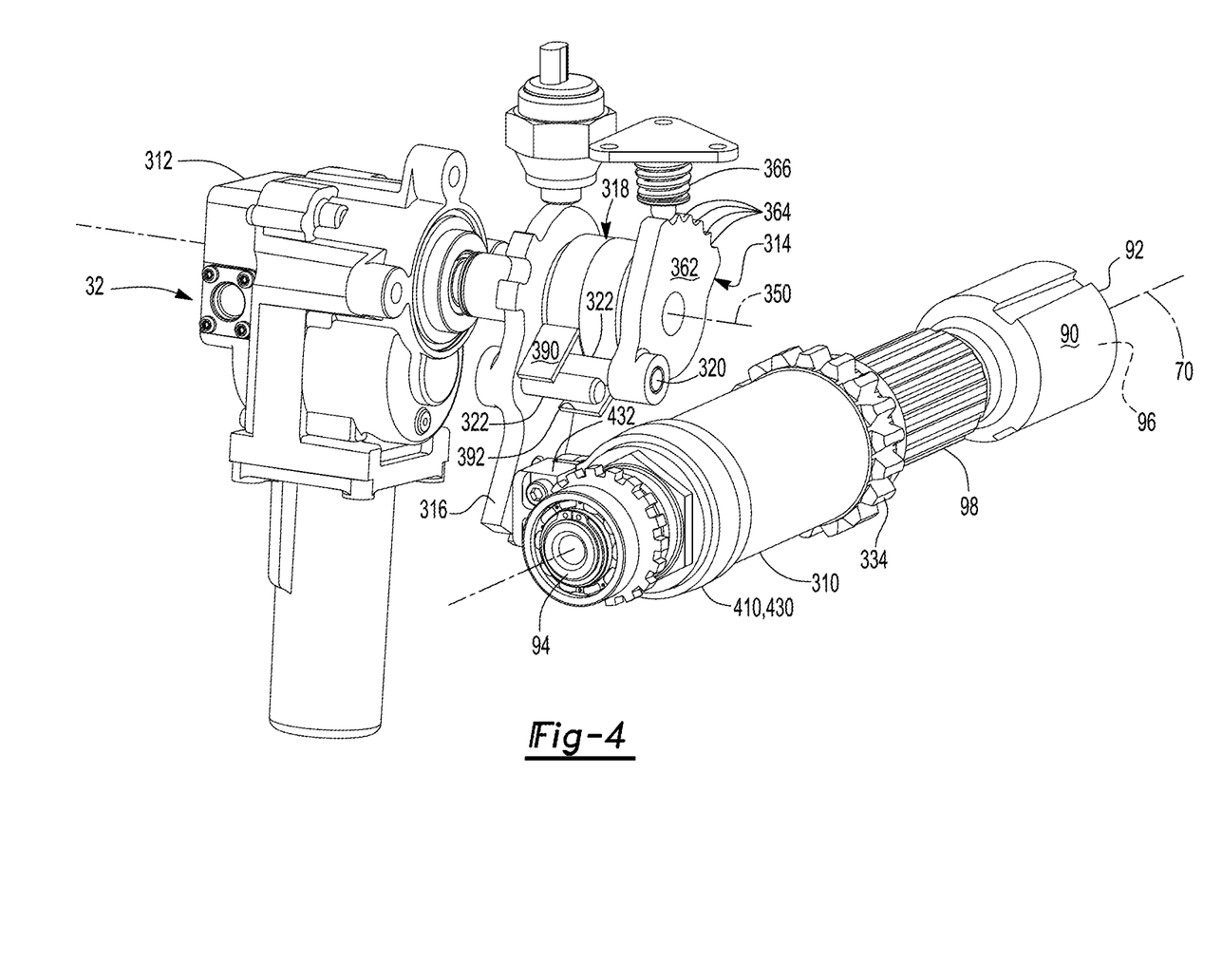
FIG. 4 is a perspective view that includes an example of a shift mechanism that may be provided with the axle assembly.

Referring primarily to FIGS. 2-4, the shift mechanism 32 may selectively connect the transmission module 28 and the drive pinion 30. For example, the shift mechanism 32 may operatively connect a member of the set of drive pinion gears 210 to the drive pinion 30 to provide torque at a desired gear ratio, and hence may change the torque transmitted between the electric motor module 26 and the differential assembly 22. The shift mechanism 32 may couple one member of the set of drive pinion gears 210 at a time to the drive pinion 30. The member of the set of drive pinion gears 210 that is coupled to the drive pinion 30 may be rotatable about the axis 70 with the drive pinion 30.

The shift mechanism 32 may be received in or partially received in a shift mechanism housing cavity 300, which is best shown in FIGS. 2 and 3. The shift mechanism housing cavity 300 may be partially defined by a housing of the axle assembly 10, such as the second transmission housing 202, and may be disposed proximate an end of the axle assembly 10. Referring to FIGS. 1 and 2, a cover 302 may be mounted on the end of the second transmission housing 202 to help enclose the shift mechanism housing cavity 300. The cover 302 is removed in FIG. 3.

The shift mechanism 32 may have any suitable configuration. In at least one configuration such as is shown with reference to FIGS. 4 and 6, the shift mechanism 32 may include a shift collar 310, an actuator 312, a detent linkage 314, a linkage 316, and a biasing member 318. The shift mechanism 32 may also include a first pin 320, a second pin 322, a first bushing 324, a second bushing 326, or combinations thereof.

Referring to primarily to FIGS. 4 and 5, the shift collar 310 may be rotatable about the axis 70 with the drive pinion 30. In addition, the shift collar 310 may be moveable along the axis 70 with respect to the drive pinion 30. The shift collar 310 may selectively connect a member of the set of drive pinion gears 210 to the drive pinion 30 as will be discussed in more detail below. The shift collar 310 may be at least partially received in the shift mechanism housing cavity 300 and may be extendable through components of the transmission 204, such as the set of drive pinion gears 210. In at least one configuration and as is best shown in FIG. 5, the shift collar 310 may include a shift collar hole 330 and a shift collar spline 332. The shift collar 310 may also include at least one shift collar gear 334 as is best shown in FIG. 4.

Referring to FIG. 5, the shift collar hole 330 may extend along the axis 70. The drive pinion 30 or the drive pinion extension 90 may be received inside the shift collar hole 330.

The shift collar spline 332 may couple the shift collar 310 to the drive pinion 30 or the drive pinion extension 90. The shift collar spline 332 may be disposed in the shift collar hole 330. The shift collar spline 332 may extend toward the axis 70 and may mate with a spline of the drive pinion 30 or the spline 98 of the drive pinion extension 90 that may have spline teeth that may extend away from the axis 70. The mating splines may allow the shift collar 310 to move in an axial direction or along the axis 70 while inhibiting rotation of the shift collar 310 about the axis 70 with respect to the drive pinion 30. Thus, the shift collar 310 may be rotatable about the axis 70 with the drive pinion 30 when the shift collar spline 332 mates with the spline of the drive pinion 30 or the drive pinion extension 90.

Referring primarily to FIG. 4, at least one shift collar gear 334 may be provided with the shift collar 310. The shift collar gear 334 may have teeth that may be arranged around the axis 70 and that may extend away from the axis 70 and away from the shift collar hole 330. The shift collar gear 334 may selectively engage a member of the set of drive pinion gears 210.

Referring primarily to FIGS. 3 and 4, the actuator 312 may be configured to move the shift collar 310 along the axis 70 to selectively connect a member of the set of drive pinion gears 210 to the drive pinion 30. The actuator 312 may be of any suitable type, such as an electrical, electromechanical, or mechanical actuator. In at least one configuration and as is best shown with reference to FIGS. 3 and 7, the actuator 312 may be mounted to a housing, such as the second transmission housing 202. As is best shown in FIGS. 6 and 7, a portion of the actuator 312 may be rotatable about an actuator axis 350. For instance, the actuator 312 may have an actuator shaft 352 that may extend along the actuator axis 350 and may be rotatable about the actuator axis 350. As is best shown in FIG. 7, the housing may define a hole 340. The actuator shaft 352 may extend through the hole 340. In addition, the actuator shaft 352 may be operatively connected to the detent linkage 314.

Figure 6:
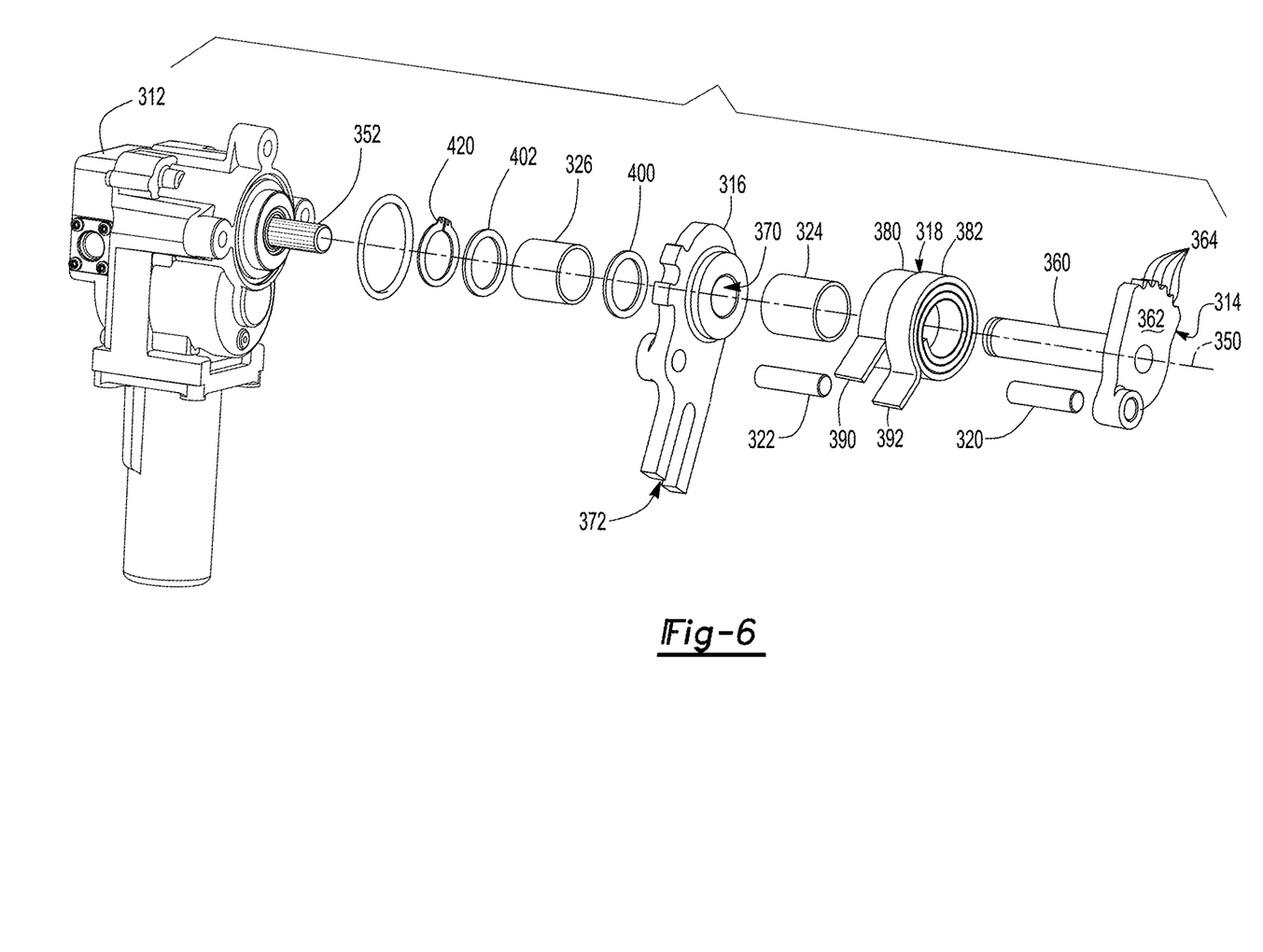
FIG. 6 is an exploded view of a portion of the shift mechanism shown in FIG. 4.

Referring to FIGS. 6 and 7, the detent linkage 314 may be coupled to the actuator 312. For instance, the detent linkage 314 may be coupled to the actuator shaft 352, such as with mating splines, and may be rotatable about the actuator axis 350 with the actuator shaft 352. In at least one configuration, the detent linkage 314 may include a detent linkage shaft 360 and a detent linkage plate 362.

The detent linkage shaft 360 may extend along or may be disposed along the actuator axis 350. The detent linkage shaft 360 may extend into the hole 340 in the second transmission housing 202. In at least one configuration, the detent linkage shaft 360 may extend around and may receive the actuator shaft 352.

The detent linkage plate 362 may extend from the detent linkage shaft 360. For example, the detent linkage plate 362 may be disposed proximate an end of the detent linkage shaft 360 that may be disposed opposite the actuator 312 and may extend from the detent linkage shaft 360 in a direction that extends away from the actuator axis 350. As is best shown in FIG. 6, the detent linkage plate 362 may define a plurality of recesses 364. The recesses 364 may be configured to receive a detent feature 366, which is best shown in FIG. 4. The detent feature 366 may inhibit rotation of the detent linkage 314 about the actuator axis 350 when the detent feature 366 is received in a recess 364. For example, rotation of the detent linkage 314 may be inhibited when the detent feature 366 is in a recess 364 and a sufficient actuation force is not provided by the actuator 312 to overcome the rotational resistance exerted by the detent feature 366. The detent linkage 314 may also be rotatable with respect to the linkage 316 as will be discussed in more detail below.

Referring primarily to FIGS. 4, 6, and 7, the linkage 316 may help operatively connect the actuator 312 to the shift collar 310. In at least one configuration, the linkage 316 may be positioned along the actuator axis 350 closer to the actuator 312 than the detent linkage 314 is positioned to the actuator 312. The linkage 316 may be rotatable about the actuator axis 350. In at least one configuration, the linkage 316 may define a linkage hole 370 through which the detent linkage shaft 360 may extend. The linkage 316 may also include an opening 372 that may facilitate coupling of the linkage 316 to a collar assembly 410, which is best shown in FIG. 4.

Referring primarily to FIGS. 4, 6, and 7, the biasing member 318 may operatively connect the detent linkage 314 to the linkage 316. In addition, the biasing member 318 may control relative rotational movement between the detent linkage 314 and the linkage 316 (e.g., rotational movement of the linkage 316 with respect to the detent linkage 314). For example, the biasing member 318 may permit the actuator shaft 352 and the detent linkage 314 to rotate about the actuator axis 350 with respect to the linkage 316 when the shift collar 310 is inhibited from moving along the axis 70 as will be discussed in more detail below. The biasing member 318 may be positioned along the actuator axis 350 between the detent linkage 314 and the linkage 316. As is best shown in FIG. 7, the biasing member 318 may also encircle the detent linkage shaft 360. The biasing member 318 may also extend around the first bushing 324. The biasing member 318 may have any suitable configuration. For instance, the biasing member 318 may be configured as a spring, such as a torsion spring. In at least one configuration, the biasing member 318 may include a first coil 380 and a second coil 382.

Referring primarily to FIG. 6, the first coil 380 may extend around the actuator axis 350. For instance, the first coil 380 may extend in a spiral around the actuator axis 350. The first coil 380 may be axially positioned closer to the linkage 316 than to the detent linkage 314. For instance, the first coil 380 may extend axially from the linkage 316 to the second coil 382. The first coil 380 may have a first tab 390.

The first tab 390 may be disposed at an end of the first coil 380. The first tab 390 may extend away from the actuator axis 350. For instance, the first tab 390 may extend in a generally radial direction or along a line that extends away from the actuator axis 350.

The second coil 382 may be attached to the first coil 380 or fixedly positioned with respect to the first coil 380. For instance, the first coil 380 and the second coil 382 may be integrally formed, may be separate parts that are subsequently fixedly attached to each other, or may be fixedly positioned with respect to each other via the detent linkage shaft 360. The second coil 382 may extend around the actuator axis 350. For instance, the second coil 382 may extend in a spiral around the actuator axis 350. The second coil 382 may be disposed closer to the detent linkage 314 than to the linkage 316. For example, the second coil 382 may extend axially from the first coil 380 to the detent linkage plate 362. The second coil 382 may have a second tab 392.

The second tab 392 may be disposed at an end of the second coil 382. The second tab 392 may extend away from the actuator axis 350. For instance, the second tab 392 may extend in a generally radial direction or along a line that extends away from the actuator axis 350. The first tab 390 and the second tab 392 may be rotationally offset from each other or positioned at different angular positions with respect to the actuator axis 350. For instance, the first tab 390 and the second tab 392 may be positioned about the actuator axis 350 such that the first tab 390 is rotationally offset from the second tab 392. As such, the first tab 390 and the second tab 392 may not be coplanar and may be disposed at different angular positions with respect to the actuator axis 350.

The first pin 320 may extend from the detent linkage plate 362 toward the linkage 316. The first pin 320 may be spaced apart from the detent linkage shaft 360 and the linkage 316. The first pin 320 may engage the first tab 390, the second tab 392, or both, and may be positioned in the short circumferential region between the first tab 390 and the second tab 392.

The second pin 322 may extend from the linkage 316 toward the detent linkage plate 362. The second pin 322 may be spaced apart from the first pin 320 and the detent linkage 314. The second pin 322 may engage the first tab 390, the second tab 392, or both, and may be positioned in the short circumferential region between the first tab 390 and the second tab 392.

Referring to FIGS. 6 and 7, the first bushing 324 may be received inside the biasing member 318. For instance, the first bushing 324 may extend around the detent linkage shaft 360 and may extend between the detent linkage shaft 360 and the biasing member 318. The first bushing 324 may extend axially between the linkage 316 and the detent linkage plate 362.

The second bushing 326 may be received inside the hole 340 in the housing. For instance, the second bushing 326 may extend radially between the detent linkage shaft 360 and the second transmission housing 202 as is best shown in FIG. 7. The second bushing 326 may be axially positioned between the actuator 312 and the linkage 316. In at least one configuration, the second bushing 326 may be axially positioned between a first washer 400 and a second washer 402.

The first washer 400 may be disposed inside the shift mechanism housing cavity 300. The first washer 400 may be axially positioned between the linkage 316 and the hole 340. For instance, the first washer 400 may extend from the linkage 316 to a first end of the second bushing 326, the second transmission housing 202, or both.

The second washer 402 may be disposed outside of the shift mechanism housing cavity 300. The second washer 402 may be axially positioned between the actuator 312 and the hole 340. For instance, the second washer 402 may extend from the second transmission housing 202, a second end of the second bushing 326, or both, toward the actuator 312. For example, the second washer 402 may engage a fastener 420 that may be coupled to the detent linkage shaft 360. The fastener 420 and the second washer 402 may cooperate to inhibit axial movement of the detent linkage 314 along the actuator axis 350, such as movement to the left from the perspective shown in FIG. 7. The fastener 420 may be of any suitable type. For instance, the fastener 420 may be a snap ring, pin, or other component that may protrude from the detent linkage shaft 360 or otherwise inhibit the second washer 402 from moving away from the second bushing 326.

Figure 8:
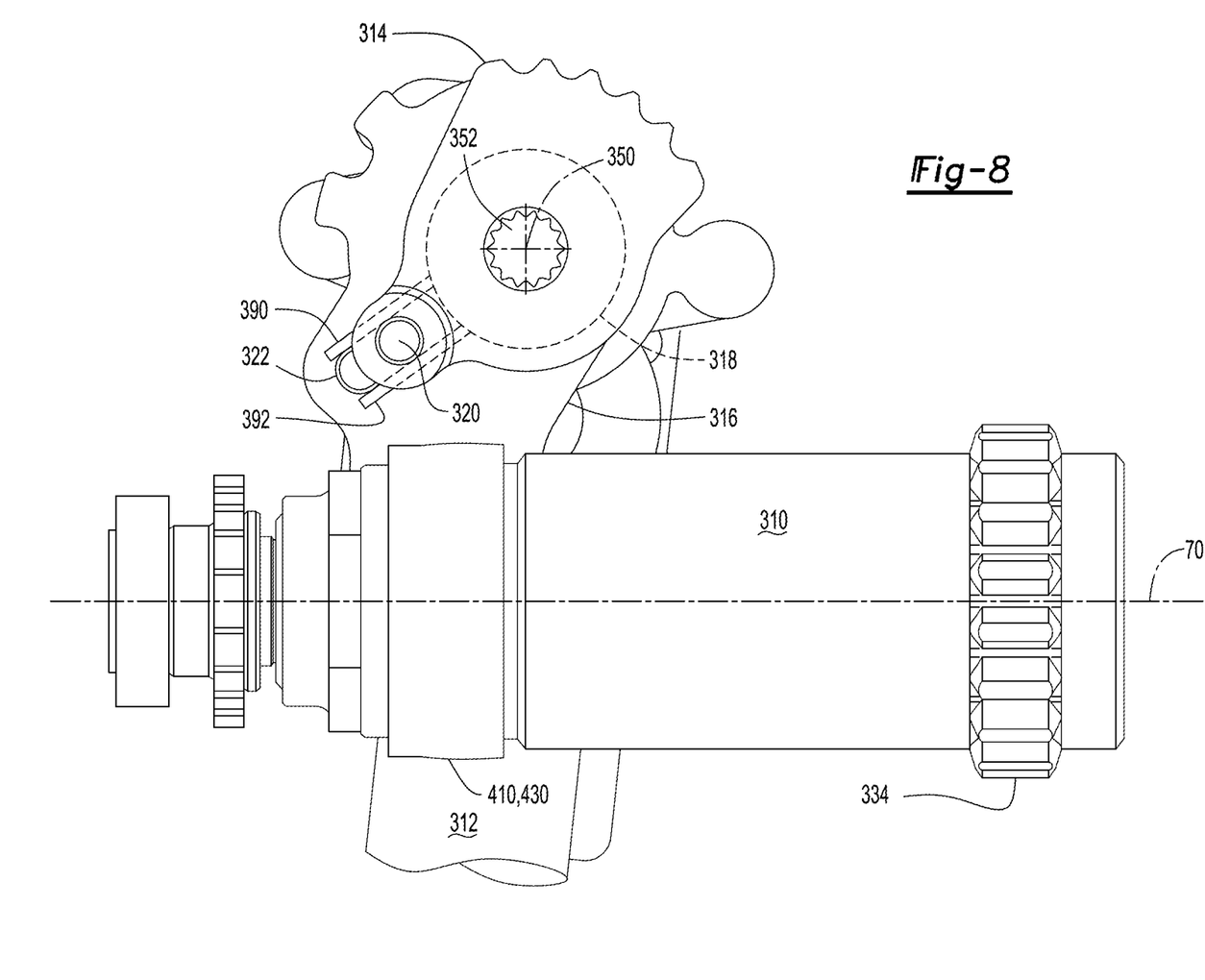
FIG. 8 is a side view of the shift mechanism in a first position.

Referring to FIGS. 4 and 8, the collar assembly 410 may receive the shift collar 310. In addition, the collar assembly 410 may operatively connect the linkage 316 to the shift collar 310. In at least one configuration, the collar assembly 410 may include a collar 430 and a shift block 432.

The collar 430 may extend at least partially around the axis 70 in the shift collar 310. For instance, the collar 430 may be configured as a ring that may encircle the shift collar 310.

The shift block 432 may be fixedly positioned with respect to the collar 430. The shift block 432 may be integrally formed with the collar 430 or may be provided as a separate component that is attached to the collar 430. For instance, the shift block 432 may extend from an outside circumference of the collar 430 or a side of the collar 430. A follower pin may extend from the shift block 432 two operatively connect the shift block 432 to the linkage 316. The follower pin may be received in the opening 372 of the linkage 316, which is best shown in FIG. 6.

Operation of the Shift Mechanism

Operation of the shift mechanism 32 will now be discussed in more detail. As an overview, components of the shift mechanism 32 may typically move together when the shift collar 310 is free to move along the axis 70. For instance, components such as the actuator shaft 352, detent linkage 314, linkage 316, and the biasing member 318 may rotate together about the actuator axis 350 when the actuator shaft 352 is rotated and the shift collar 310 is free to move along the axis 70. However, some of these components may move respect to each other when the shift collar 310 is not free to move along the axis 70. For instance, the actuator shaft 352 and the detent linkage 314 may be rotatable with respect to the linkage 316 when the shift collar 310 is not free to move along the axis 70. The shift collar 310 may not be free to move along the axis 70 when the rotational speed of the shift collar 310 about the axis 70 is not sufficiently synchronized with the rotational speed of a member of the set of drive pinion gears 210. For instance, the shift collar 310 may be blocked from shifting or moving along the axis 70 when the teeth of the shift collar gear 334 are inhibited from entering the gaps between the inner gear teeth of a drive pinion gear or exiting the gaps between the inner gear teeth of a drive pinion gear. An example of movement when the shift collar 310 is not free to move along the axis 70 or is blocked from shifting is best understood with reference to FIGS. 8 and 9.

Referring to FIG. 8, the shift mechanism 32 is shown in a first position. The first tab 390 of the first coil 380 and the second tab 392 of the second coil 382 may engage the first pin 320, the second pin 322, or both, when the shift collar 310 is free to move along the axis 70. Such engagement may be maintained during rotation of the actuator shaft 352, detent linkage 314, linkage 316, and biasing member 318 about the actuator axis 350. Moreover, the first tab 390 and the second tab 392 may not move with respect to each other or the angular distance between the first tab 390 and the second tab 392 may remain substantially constant.

Figure 9:
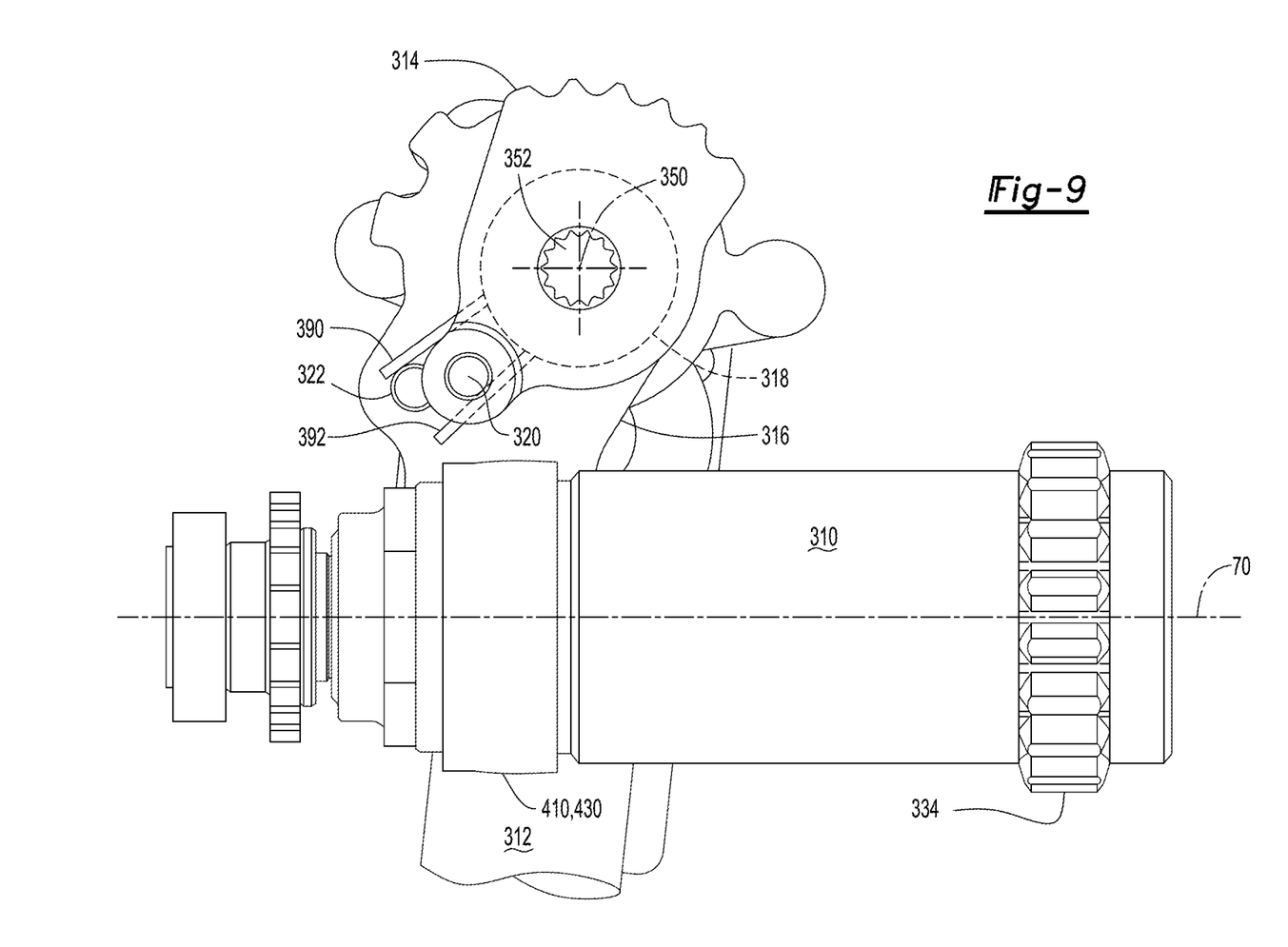
FIG. 9 is a side view of the shift mechanism in a second position associated with a blocked shift condition.

Referring to FIG. 9, the shift mechanism 32 is shown in a second position that is associated with a blocked shift condition. The shift collar 310, the linkage 316, and the collar assembly 410 are shown in the same position as in FIG. 8 to represent a blocked shift condition in which the shift collar 310 is inhibited from moving to the right from the perspective shown or in a first direction along the axis 70. The actuator shaft 352 and the detent linkage 314 are rotated counterclockwise about the actuator axis 350 from the perspective shown. The distance of rotation is merely an example and may differ from that shown.

Relative rotational movement of the detent linkage 314 with respect to the linkage 316 is accommodated by the biasing member 318. The first pin 320 may remain in engagement with the second tab 392 but may be rotated to disengage or move away from the first tab 390. The second pin 322 may remain in engagement with the first tab 390 but may be disengaged from the second tab 392. This relative rotational movement may store potential energy in the biasing member 318. The potential energy may be released when the blocked shift condition is no longer present, such as when the rotational speed of the shift collar 310 is sufficiently synchronized with the rotational speed of a member of the set of drive pinion gears 210 to permit axial movement of the shift collar 310. As a result, the actuator 312 may complete its intended rotation of the actuator shaft 352 as if the shift collar 310 not blocked even when a blocked shift condition is present, thereby avoiding heating/overheating of the actuator 312 and the consumption of energy that would occur if the actuator 312 had to continuously work or exert force to attempt to complete shifting of the shift collar 310. Moreover, sufficient potential energy may be stored in the biasing member 318 that may be released to complete a shift of the shift collar 310 when sufficient synchronization is obtained.

It is noted that the first pin 320 and the second pin 322 may contact opposite tabs when the actuator shaft 352 is rotated in the opposite direction about the actuator axis 350 and a blocked shift condition exists. For instance, the first pin 320 may engage the first tab 390 but not the second tab 392 while the second pin 322 may engage the second tab 392 but not the first tab 390 when the actuator shaft 352 is rotated in a clockwise direction from the perspective shown and a blocked shift condition exists. As such, either the first tab 390 or the second tab 392 may engage a pin, such as the first pin 320 or the second pin 322, when the detent linkage 314 is rotated about the actuator axis 350 and the shift collar 310 is inhibited from moving along the axis 70 depending on the direction of rotation of the actuator shaft 352.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A shift mechanism comprising:
an actuator that has an actuator shaft that is rotatable about an actuator axis;
a detent linkage that is rotatable about the actuator axis with the actuator shaft;
a linkage that is rotatable about the actuator axis;
a shift collar that is operatively connected to the linkage and moveable along an axis; and
a biasing member that operatively connects the detent linkage to the linkage and that permits the actuator shaft and the detent linkage to rotate about the actuator axis with respect to the linkage when the shift collar is inhibited from moving along the axis.

2. The shift mechanism of claim 1 wherein the biasing member is positioned along the actuator axis between the linkage and the detent linkage.

3. The shift mechanism of claim 2 wherein the detent linkage has a detent linkage shaft that extends along the actuator axis and the biasing member encircles the detent linkage shaft.

4. The shift mechanism of claim 3 wherein a first bushing extends around the detent linkage shaft and the biasing member extends around the first bushing.

5. The shift mechanism of claim 4 wherein the detent linkage has a detent linkage plate that is disposed at an end of the detent linkage shaft and the first bushing and the biasing member extend axially between the detent linkage plate and the linkage.

6. The shift mechanism of claim 1 wherein the biasing member has a first coil that extends around the actuator axis and a second coil that extends around the actuator axis and that is attached to the first coil.

7. The shift mechanism of claim 6 wherein the first coil is disposed closer to the linkage than to the detent linkage.

8. The shift mechanism of claim 7 wherein the detent linkage has a detent linkage shaft that extends along the actuator axis and a detent linkage plate that is disposed at an end of the detent linkage shaft and wherein the first coil extends from the linkage to the second coil and the second coil extends from the first coil to the detent linkage plate.

9. A shift mechanism comprising:
an actuator that has an actuator shaft that is rotatable about an actuator axis;

a detent linkage that is rotatable about the actuator axis with the actuator shaft, the detent linkage having a detent linkage shaft that is disposed along the actuator axis and a detent linkage plate that extends from the detent linkage shaft;

a linkage that is rotatable about the actuator axis;

a shift collar that is operatively connected to the linkage and moveable along an axis; and a biasing member that controls relative rotational movement of the linkage and the detent linkage, the biasing member including:

a first coil that extends around the actuator axis and that has a first tab that extends away from the actuator axis; and a second coil that extends around the actuator axis and that is disposed adjacent to the first coil, the second coil having a second tab that extends away from the actuator axis, wherein the first tab and the second tab are positioned about the actuator axis such that the first tab is rotationally offset from the second tab.

10. The shift mechanism of claim 9 wherein a first pin extends from the detent linkage plate toward the linkage and is engageable with the second tab.

11. The shift mechanism of claim 10 wherein a second pin extends from the linkage and is engageable with the first tab.

12. The shift mechanism of claim 11 wherein the first pin and the second pin are engageable with the first tab and the second tab.

13. The shift mechanism of claim 11 wherein the first tab and the second tab engage the second pin when the shift collar is free to move along the axis.

14. The shift mechanism of claim 11 wherein either the first tab or the second tab engages the second pin when the detent linkage is rotated about the actuator axis and the shift collar is inhibited from moving along the axis.

15. The shift mechanism of claim 11 wherein the first pin engages the second tab but not the first tab and the second pin engages the first tab but not the second tab when the detent linkage is rotated about the actuator axis in a first rotational direction and the shift collar is inhibited from moving in a first direction along the axis.

16. The shift mechanism of claim 11 wherein the actuator is mounted to a housing that defines a hole through which the actuator shaft extends.

17. The shift mechanism of claim 16 wherein the detent linkage shaft extends into the hole in the housing and receives the actuator shaft.

18. The shift mechanism of claim 17 wherein a second bushing is received inside the hole in the housing and extends between the housing and the detent linkage shaft.

19. The shift mechanism of claim 18 wherein the housing defines a cavity that receives the shift collar, and the second bushing is axially positioned between a first washer that is disposed in the cavity and a second washer that is disposed outside of the cavity.

20. The shift mechanism of claim 19 wherein the first washer extends from the linkage to the second bushing and the second washer extends from the second bushing to a fastener that is coupled to the detent linkage shaft to inhibit axial movement of the detent linkage along the actuator axis.

* * * * *